United States Patent
McCracken et al.

(10) Patent No.: US 12,217,229 B2
(45) Date of Patent: Feb. 4, 2025

(54) BIOMETRIC AUTHENTICATION OF PRE-STAGED SELF-SERVICE TERMINAL TRANSACTIONS

(71) Applicant: NCR Atleos Corporation, Atlanta, GA (US)

(72) Inventors: Heather McCracken, Scotland (GB); Marcia Togara, Scotland (GB)

(73) Assignee: NCR Atleos Corporation, Atlanta, GA (US)

( * ) Notice: Subject to any disclaimer, the term of this patent is extended or adjusted under 35 U.S.C. 154(b) by 1150 days.

(21) Appl. No.: 14/699,492

(22) Filed: Apr. 29, 2015

(65) Prior Publication Data
US 2016/0321627 A1  Nov. 3, 2016

(51) Int. Cl.
| | | |
|---|---|---|
| G06Q 20/10 | (2012.01) | |
| G06F 21/32 | (2013.01) | |
| G06F 21/35 | (2013.01) | |
| G06F 21/43 | (2013.01) | |
| G06Q 20/18 | (2012.01) | |

(Continued)

(52) U.S. Cl.
CPC ......... *G06Q 20/1085* (2013.01); *G06F 21/32* (2013.01); *G06F 21/35* (2013.01); *G06F 21/43* (2013.01); *G06Q 20/18* (2013.01); *G06Q 20/3278* (2013.01); *G06Q 20/40145* (2013.01); *G07F 19/20* (2013.01); *H04L 63/0861* (2013.01); *H04W 12/069* (2021.01); *G06F 2221/2117* (2013.01); *H04W 88/02* (2013.01)

(58) Field of Classification Search
CPC ..... G06Q 20/00–425; G06F 21/00–88; H04W 12/00–80
See application file for complete search history.

(56) References Cited

U.S. PATENT DOCUMENTS

| | | | |
|---|---|---|---|
| 8,458,465 B1 * | 6/2013 | Stern ....................... | G06F 21/32 709/229 |
| 2004/0020984 A1 * | 2/2004 | Clark ...................... | G07F 19/20 235/382 |

(Continued)

FOREIGN PATENT DOCUMENTS

| | | |
|---|---|---|
| EP | 2391967 | 2/2016 |
| WO | 2008/074342 A1 | 6/2008 |
| WO | 2010/086420 | 8/2010 |

*Primary Examiner* — Mohammad A. Nilforoush
(74) *Attorney, Agent, or Firm* — Schwegman Lundberg & Woessner, P.A.

(57) ABSTRACT

Various embodiments herein each include at least one of systems, methods, and software for biometric authentication of pre-staged self-service terminal transactions. One embodiment in the form of a method includes connecting, wirelessly via a wireless communication device of a mobile device, to a Self-Service Terminal (SST), such as an ATM or self-service checkout terminal. The mobile device then receives, via the wireless communication device from the SST, biometric authentication data to authenticate an account holder. The received biometric data is then compared on the mobile device with biometric data stored on or read by a biometric reader of the mobile device. When the comparing identifies a match between the received biometric data and the biometric data read by or stored on the mobile device, the method then transmits an authentication message via the wireless communication device to the SST indicating the match.

5 Claims, 5 Drawing Sheets

(51) Int. Cl.
*G06Q 20/32* (2012.01)
*G06Q 20/40* (2012.01)
*G07F 19/00* (2006.01)
*H04L 9/40* (2022.01)
*H04W 12/069* (2021.01)
*H04W 88/02* (2009.01)

(56) References Cited

U.S. PATENT DOCUMENTS

| | | | |
|---|---|---|---|
| 2007/0198848 A1* | 8/2007 | Bjorn | G06F 21/35 |
| | | | 713/186 |
| 2010/0017327 A1* | 1/2010 | Treadwell | G06Q 20/04 |
| | | | 705/43 |
| 2013/0085940 A1* | 4/2013 | O'Laughlin | G06Q 20/042 |
| | | | 705/44 |

\* cited by examiner

BIOMETRIC AUTHENTICATION OF PRE-STAGED SELF-SERVICE TERMINAL TRANSACTIONS

BACKGROUND INFORMATION

Retailers and banks have been moving rapidly to use of Self-Service Terminals (SSTs), such as self-service checkout terminals and Automated Teller Machines (ATMs), for several years. With the increasing prevalence of customer mobile device usage, these same entities have been working toward a marriage between mobile devices and SSTs to provide enhanced customer experiences. For example, customers are now able to generate a transaction within a mobile device app that is to be completed by or performed at an SST. While these advances have been quite rapid, validating customers at SSTs has lagged as customers typically utilize a magnetic strip of a card along with a Personal Identification Number (PIN) to identify themselves. Doing this may provide abilities to withdraw funds and purchase goods and services with funds coming from a bank or credit account. However, such cards and PINs are frequently compromised. Biometric validation of customers has become more common in recent years, but the solutions to date require the customer to provide a biometric sample to an entity, such as a fingerprint scan, which is then stored by the entity for later use in validation. However, should a stored biometric data item be compromised similar to recent, large-scale credit card data thefts, security of biometric solutions may be permanently compromised as people can change their passwords, but not their fingerprints.

SUMMARY

Various embodiments herein each include at least one of systems, methods, and software for biometric authentication of pre-staged self-service terminal transactions. One embodiment, in the form of a method that may be performed on a mobile device, such as a smartphone, tablet, smartwatch, and the like, includes receiving input, within a mobile device app, defining a transaction to be completed on an SST against an account. This method further includes transmitting data via a first wireless communication device of a mobile device on which the mobile device app executes to pre-stage the transaction on a server for download by the SST upon authentication of an account holder of the account. Next, the method includes connecting, wirelessly via a second wireless communication device of the mobile device app, to the SST and receiving, via the second wireless communication device from the SST, biometric data to authenticate the account holder. The mobile device app then compares the received biometric data with biometric data of the account holder. When the comparing identifies a match between the received biometric data and the biometric data of the account holder, the method includes transmitting an authentication message via the second wireless communication device to the SST.

Another method according to some embodiments includes connecting, wirelessly via a wireless communication device of a mobile device, to an SST. The mobile device then receives, via the wireless communication device from the SST, biometric authentication data to authenticate an account holder. The received biometric data is then compared on the mobile device with biometric data stored on or read by a biometric reader of the mobile device. When the comparing identifies a match between the received biometric data and the biometric data read by or stored on the mobile device, the method then transmits an authentication message via the wireless communication device to the SST indicating the match.

A further embodiment is in the form of an SST. The SST of such embodiments includes a biometric reading device, a first data communication interface device, a second data communication interface device, the second data communication device including wireless data communication capabilities, at least one computer processor, and at least one memory device. The at least one memory device stores instructions executable by the at least one processor to cause the SST to perform data processing activities. The data processing activities, in some embodiments, include receiving biometric data from the biometric reading device and transmitting a representation of the biometric data, via the second data communication interface device to a mobile device to obtain an authentication of the biometric data. The data processing activities may further include receiving, via the second data communication interface device, authentication of the biometric data and retrieving, via the first data communication interface device, data defining a pre-staged transaction to be completed on the SST.

DETAILED DESCRIPTION

Figure 1:
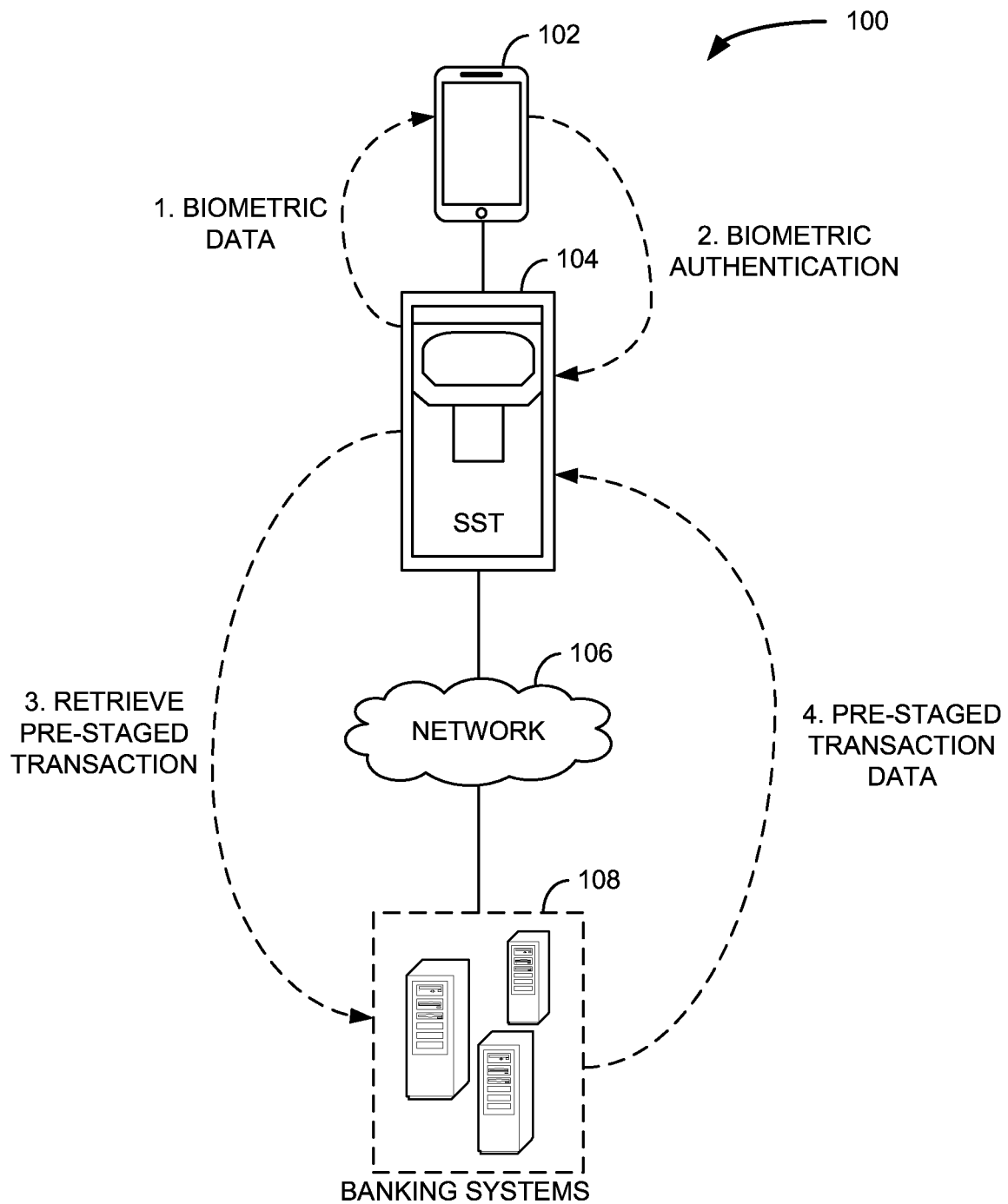
FIG. 1 is a logical block diagram of a system, according to an example embodiment.

Various embodiments herein each include at least one of systems, methods, and software for biometric authentication of pre-staged self-service terminal transactions. In some embodiments, a customer may utilize a mobile device app to generate a transaction to be completed or performed on an SST, such as by identifying an item to purchase or an ATM withdraw. Data of the transaction to be performed may then be transmitted by the mobile device app to a server where the transaction will be pre-staged. When ready, the customer will approach an SST and the mobile device will connect to the SST via a wireless communication protocol, such as BLUETOOTH®, a Near-Field Communication (NFC) protocol, Wi-Fi, and the like. In some embodiments, this wireless connection is a peer-to-peer connection. The connection may be established automatically under the direction of a particular mobile device app, such as the mobile device app utilized to pre-stage the transaction. The customer will then initiate the transaction on the SST by providing a biometric sample, such as a fingerprint scan or retina scan on the SST. The SST may then transmit a data form of the biometric sample, also referred to as a biometric scan and biometric data, to the mobile device via the previously established connection. The customer will have already been authenticated with regard to a customer account, such as a bank account, customer shopping account, digital wallet account, and the like, or will be upon receipt of customer account credentials. The mobile device app will then receive the data of the biometric sample received by the mobile device and attempt to authenticate the biometric sample based upon biometric data previously stored on the mobile device by the customer or upon receipt of a biometric scan by a biometric reading device of the mobile device. When a match is not made, an error code may be transmitted back to the SST. However, when a match is made, the mobile device app may transmit back to the SST via the previously established wireless connection, data identifying the match and an account identifier that enables the SST to retrieve the pre-staged transaction from the server where it is stored. The data transmitted from the mobile device to the SST may further include security data in some embodiments, or the data may be encrypted. Through such methods, customer biometric data may be retained by the customer for validation purposes. Further, the biometric data present on the SST may be maintained in a secure memory or memory that is flushed upon completion of the authentication to ensure customer biometric data is not stored or compromised.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is a logical block diagram of a system 100, according to an example embodiment. The system 100 includes a mobile device 102, an SST 104, a network 106, and a banking systems 108. The mobile device 102 may be a smartphone, smartwatch, tablet, personal computer, and other mobile device types. The SST 106 may be an ATM, and self-service checkout terminal, a hybrid customer assisted/self-service terminal, and the like. The network may be or include one or more of a secured ATM network, the Internet, a virtual private network, a local area network, a wide area network, and other secured and unsecured networks. The banking systems 108 are generally backend systems that support execution of transactions performed or completed on an SST 104. While the system 100 includes the banking systems 108, the banking systems 108 may instead be backend systems of a retail outlet or other entity on which transactions may be pre-staged and executed, at least in part. Note that although the mobile device 102 is not illustrated as connected to the network 106, such a connection does exist in typical embodiments as a transaction may be initiated on the mobile device 102 and pre-staged to the banking systems 108 for retrieval by the SST 104 upon biometric authentication of an individual on the mobile device 102 and as provided by the mobile device 102 to the SST 104.

In some embodiments, the mobile device 102 includes a stored data representation of a biometric scan, such as that of a customer fingerprint, retina scan, image facial recognition features, and other possible biometric data. The mobile 102 device further includes an app that executes thereon that provides transaction pre-staging functionality. The transaction pre-staging functionality allows a customer to define a transaction to be performed or completed at the SST 104, such as a bank account withdrawal when the SST is an ATM or a purchase of an item or service at a checkout terminal. Once the transaction is defined within the mobile device 102 app, the mobile device 102 app transmits data defining the transaction to a backend system, such as the banking systems 108, to pre-stage the transaction.

The customer then arrives at the SST 104 and provides a biometric input of the type stored on the mobile device 102. The SST 104 therefore includes a biometric reading device, such as a fingerprint scanner, retinal scanner, or camera capable of capturing images and facial recognition software that identifies facial recognition features. The biometric data is then transmitted to the mobile device 102 via an ad hoc and on demand wireless peer-to-peer connection, such as may be established via Wi-Fi, BLUETOOTH®, NFC, and the like. The mobile device 102 app receives the biometric data and performs and authentication in view of the stored biometric data. The authentication may also or alternatively be performed with regard to a newly captured biometric scan on the mobile device 102 in some embodiments. When authenticated, the mobile device 102 app generates a message including an authentication, which may include a security code or certificate, one or both of an account identifier and a pre-staged transaction identifier to enable retrieval of the pre-staged transaction, and other data, depending on the embodiment. The message is then transmitted from the mobile device 102 to the SST 104 via the previously established wireless connection.

The SST 104, upon receipt of the authentication from the mobile device 102, retrieves data defining the pre-staged transaction from the banking systems 108 via the network 106. The banking systems 108 then provide the pre-staged transaction data, via the network 106, to the SST 104. The SST 104 may then complete the transaction.

Figure 2:
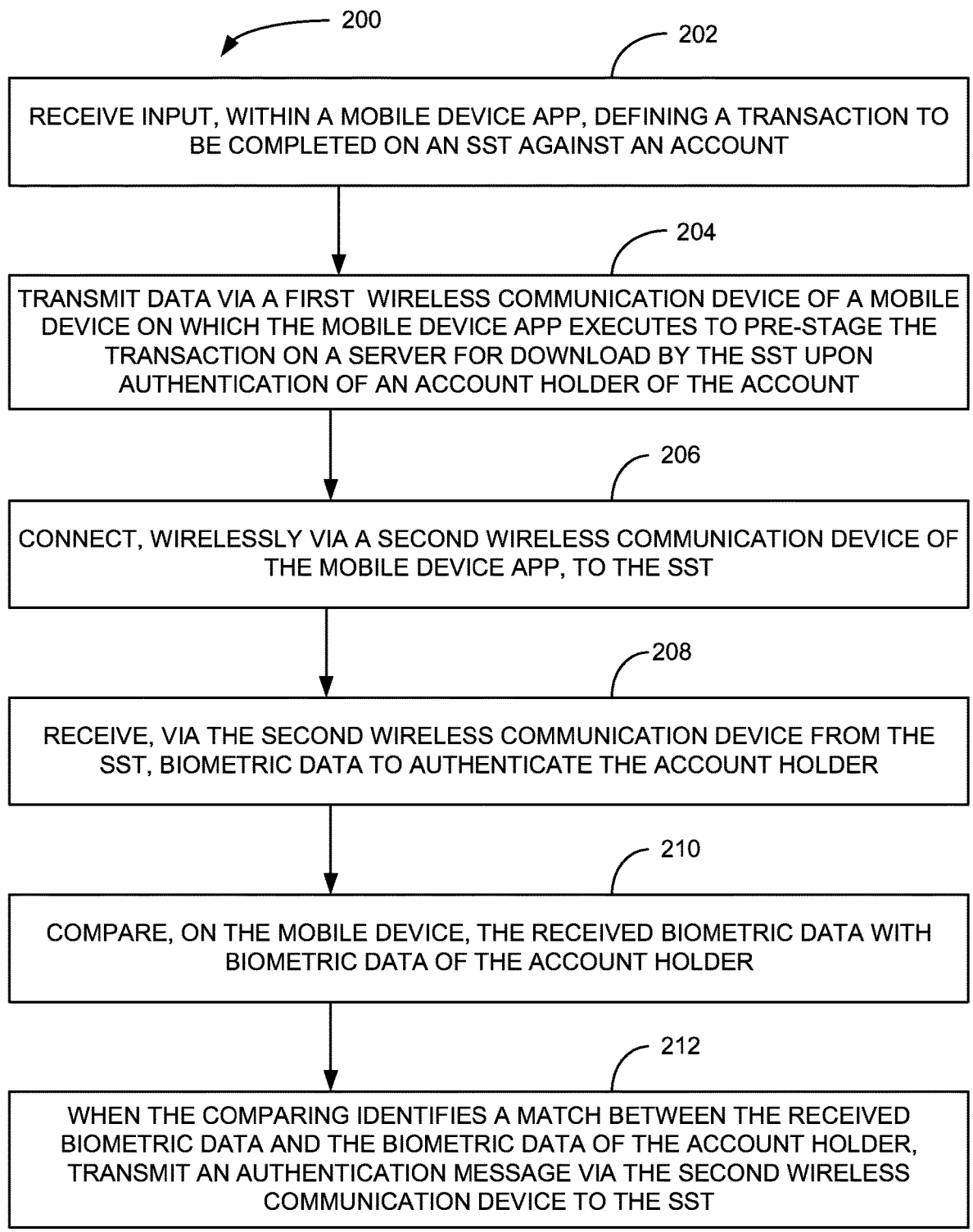
FIG. 2 is a block flow diagram of a method, according to an example embodiment.

FIG. 2 is a block flow diagram of a method 200, according to an example embodiment. The method 200 is an example of a method that may be performed on a mobile device according to instructions stored thereon as part of a mobile device app. The method 200 includes receiving 202 input, within the mobile device app, defining a transaction to be completed on an SST against an account, such as a bank, credit, or other customer account-type. The method 200 further includes transmitting 204 data via a first wireless communication device of the mobile to pre-stage the transaction on a server for download by the SST upon authentication of an account holder of the account. The first wireless communication device may be a Wi-Fi enabled device, a radio transceiver device enabling the mobile device to communicate on a wireless service network, and the like.

The method 200 continues by connecting 206, wirelessly via a second wireless communication device of the mobile device app, to the SST. The second wireless communication device may be a BLUETOOTH® data communication device, an NFC communication device, the same Wi-Fi enabled device of the first wireless communication device, and the like.

Next, the method 200 includes receiving 208, via the second wireless communication device from the SST, biometric data to authenticate the account holder and comparing 210, on the mobile device, the received biometric data with biometric data of the account holder. In some such embodiments, when the comparing 210 identifies a match between the received biometric data and the biometric data of the account holder, the method 200 includes transmitting 210 an authentication message via the second wireless communication device to the SST.

In some embodiments of the method 200, the comparing 210 of the received 208 biometric data with biometric data of the account holder includes retrieving biometric data stored on the mobile device. Such embodiments may then compare the received 208 biometric data and the retrieved biometric data to identify whether there is a match and when there is a match, determine a confidence level of the match. In some such embodiments, transmitting 212 the authentication message to the SST includes transmitting the confidence level. In some embodiments, the biometric data stored on the mobile device may be stored securely by the mobile device app and is not accessible and never shared by the mobile device with other mobile device apps or otherwise within our outside the bounds of the mobile device.

In some embodiments, the authentication message includes an account identifier of the account. The account identifier in such embodiments identifies the pre-staged transaction associated with the account to be retrieved. The authentication message may further include security data indicating validity of the authentication message to the SST. This security data may be in the form of encryption of at least a portion of the authentication message according to an encryption key stored on the mobile device, obtained by the mobile device app when pre-staging the transaction, or otherwise possessed or obtained by the mobile device app.

Figure 3:
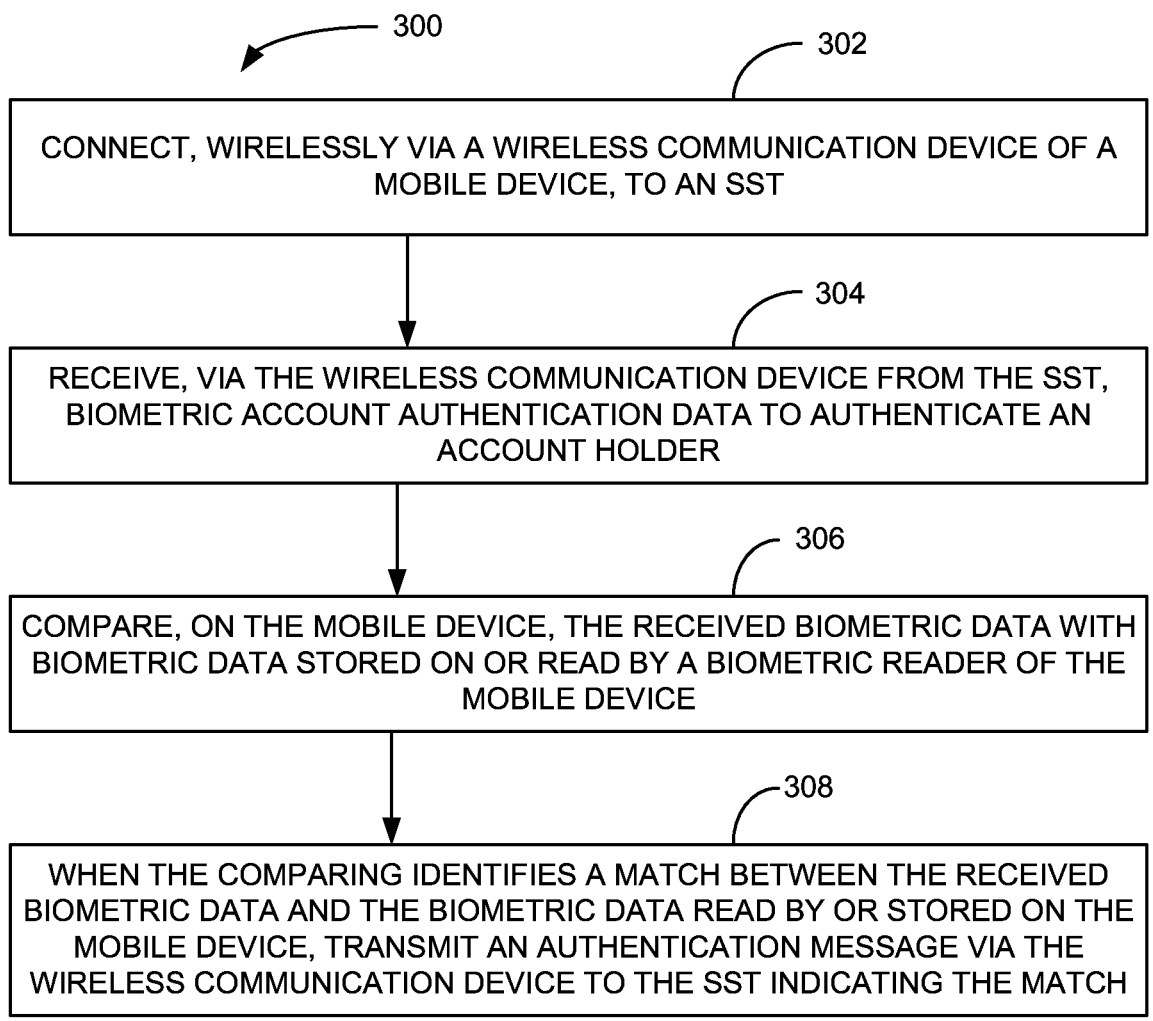
FIG. 3 is a block flow diagram of a method, according to an example embodiment.

FIG. 3 is a block flow diagram of a method 300, according to an example embodiment. The method 300 is another example of a method that may be performed on a mobile device according to instructions stored thereon as part of a mobile device app. The method 300 includes connecting 302, wirelessly via a wireless communication device of a mobile device app, to an SST. The method 300 further includes receiving 304, via the wireless communication device from the SST, biometric authentication data to authenticate an account holder and comparing 306 on the mobile device, the received biometric data with biometric data stored on or read by a biometric reader of the mobile device. The method 300, upon identifying a match between the received 304 biometric data and the biometric data read by or stored on the mobile device, may then transmit 308 an authentication message via the wireless communication device to the SST indicating the match.

In some embodiments, the comparing of the received 304 biometric data with biometric data read by or stored on the mobile device includes retrieving biometric data stored on the mobile device. The comparing 306 may then be performed between received 304 biometric data and the retrieved biometric data to identify whether there is a match. When there is a match, the method 300 may then determine a confidence level of the match. The transmitting 308 of the authentication message to the SST in such embodiments includes transmitting 308 the confidence level.

Figure 4:
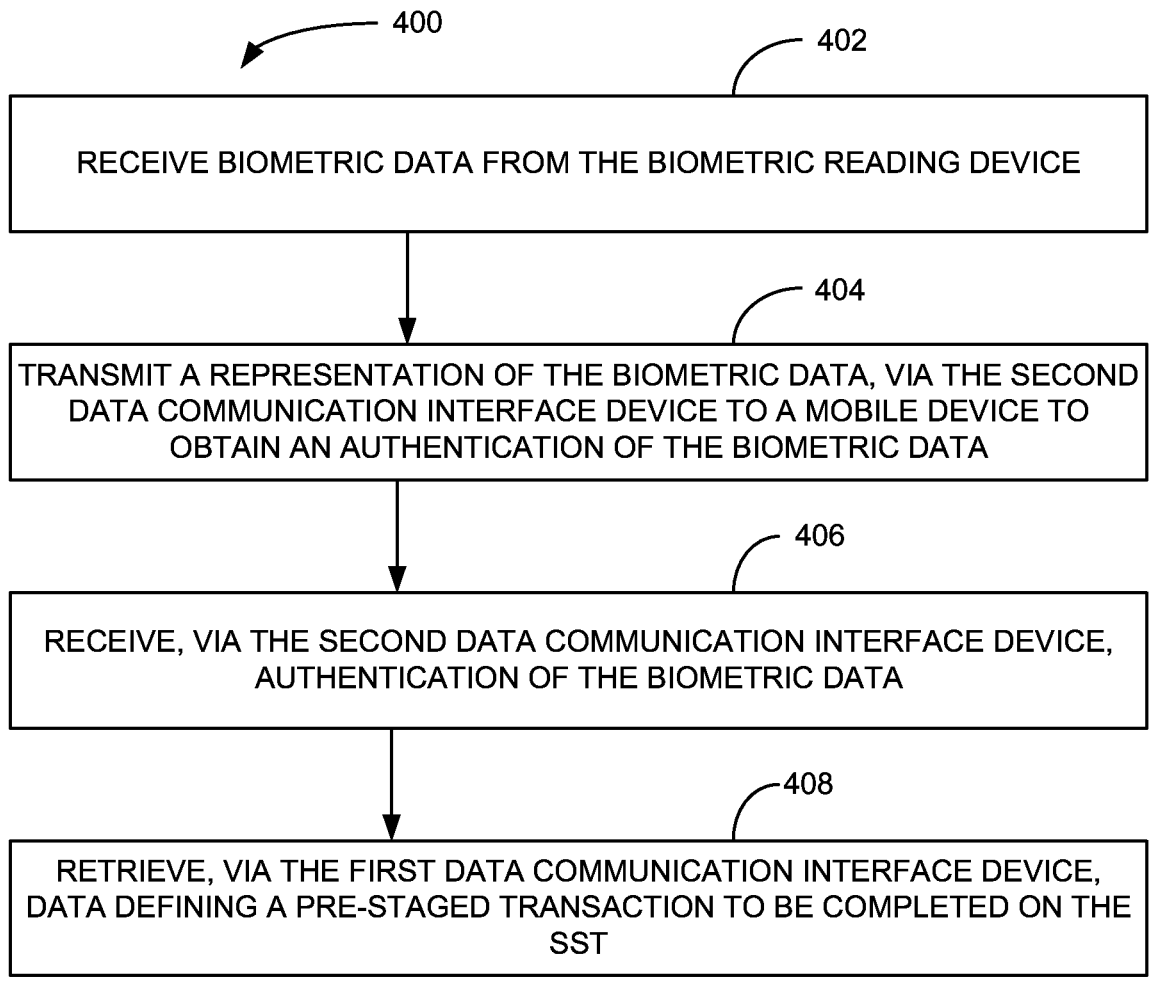
FIG. 4 is a block flow diagram of a method, according to an example embodiment.

FIG. 4 is a block flow diagram of a method 400, according to an example embodiment. The method 400 is an example of a method that may be performed by a computer controlling operation of an SST, such as an ATM or a checkout terminal. The method 400 includes receiving 402 biometric data from the biometric reading device of the SST and transmitting 404 a representation of the biometric data, via a short-range data communication interface device to a mobile device to obtain an authentication of the biometric data. The short-range data communication interface device may be a BLUETOOTH® device, an NFC enabled device, or other similar device. Note however that in some embodiments the short-range data communication interface device may instead be a Wi-Fi enabled device.

The method 400 further includes receiving 406, via the short-range data communication interface device, authentication of the biometric data from the mobile device and retrieving 408 via wireless network data communication interface device, such as a Wi-Fi enabled device, data defining a pre-staged transaction to be completed on the SST. Once the pre-staged transaction data is retrieved, the SST may complete the transaction.

In some embodiments, the received 406 authentication message includes an account identifier and the retrieving 408 of the data defining the pre-staged transaction is performed based at least in part on the account identifier.

In another embodiment, the received 406 authentication message includes data identifying a confidence level of a match between the representation of the biometric data transmitted 404 to the mobile device and biometric data on the mobile device. In such an embodiment, the retrieving 408 of the data defining the pre-staged transaction is performed only when the confidence level at least meets a threshold confidence level. In this and some other embodiments, the received 406 authentication message may include security data. In such embodiments, the method 400 may further include validating the security data, such as by decrypting data or validating a certificate, and retrieving 408 the data defining the pre-staged transaction only when the security data is valid.

Figure 5:
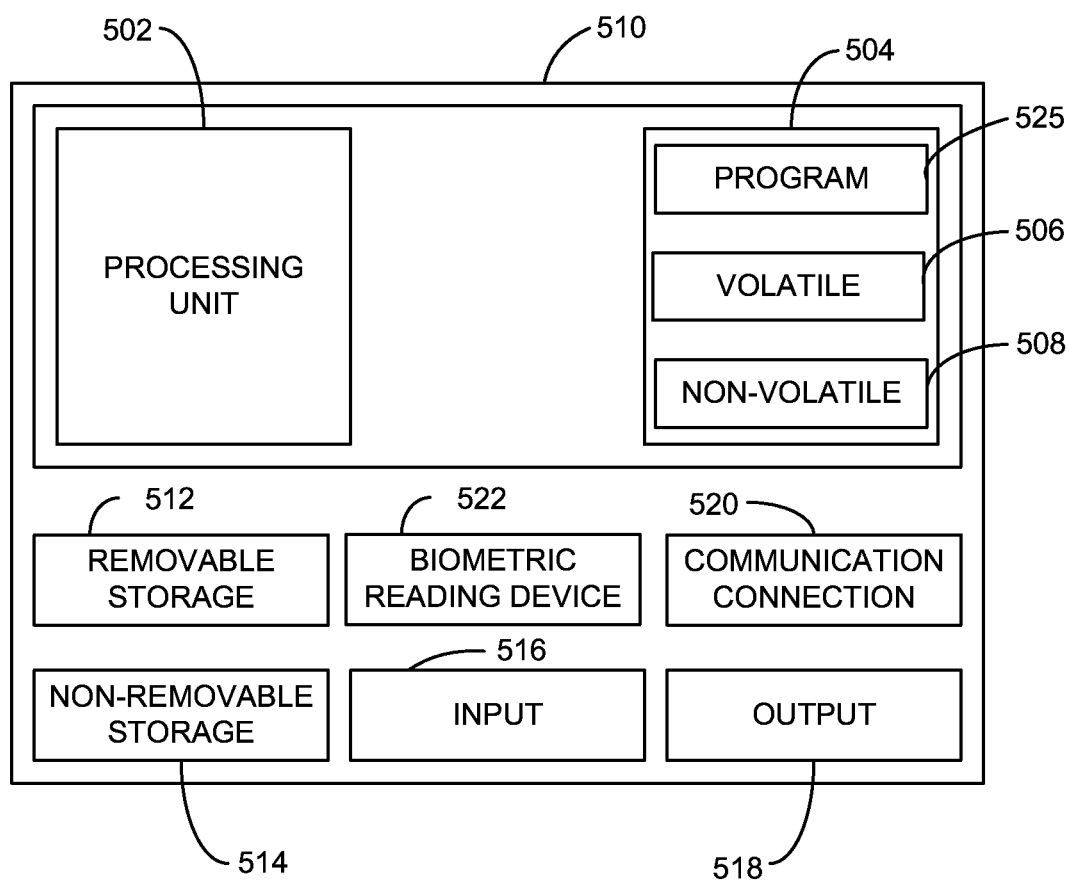
FIG. 5 is a block diagram of a computing device, according to an example embodiment.

FIG. 5 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 510, may include a processing unit 502, memory 504, removable storage 512, and non-removable storage 514. Although the example computing device is illustrated and described as computer 510, the computing device may be in different forms in different embodiments. For example, the computing device may instead be a smartphone, a tablet, smartwatch, or other computing device including the same or similar elements as illustrated and described with regard to FIG. 5. Devices such as smartphones, tablets, and smartwatches are generally collectively referred to as mobile devices. In other embodiments, the computing device may be a computer that controls operation of an SST or a computer deployed as a server, such as a host of one or more banking software systems. Further, although the various data storage elements are illustrated as part of the computer 510, the storage may also or alternatively include cloud-based storage accessible via a network, such as the Internet.

Returning to the computer 510, memory 504 may include volatile memory 506 and non-volatile memory 508. Computer 510 may include—or have access to a computing environment that includes a variety of computer-readable media, such as volatile memory 506 and non-volatile memory 508, removable storage 512 and non-removable storage 514. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 510 may include or have access to a computing environment that includes input 516, output 518, and a communication connection 520. The input 516 may include one or more of a touchscreen, touchpad, mouse, keyboard, camera, one or more device-specific buttons, one or more sensors integrated within or coupled via wired or wireless data connections to the computer 510, and other input devices. The computer 510 may operate in a networked environment using a communication connection 520 to connect to one or more remote computers, such as database servers, web servers, and other computing device. An example remote computer may include a personal computer (PC), server, router, network PC, a peer device or other common network node, or the like. The communication connection 520 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 520 may also or alternatively include a transceiver device, such as a BLUETOOTH® device that enables the computer 510 to wirelessly receive data from and transmit data to other BLUETOOTH® devices.

In some embodiments, the computer 510 also includes a biometric reading device 522. The biometric reading device 522 may be a fingerprint reading device. In other embodiments, the biometric reading device 522 may be an iris scanner. In further embodiments, the biometric reading device 522 may instead be a firmware or software element that executes upon images captured by an imaging device to perform facial recognition. The biometric reading device 522 may take different forms and be of these and other types in various embodiments.

Computer-readable instructions stored on a computer-readable medium are executable by the processing unit 502 of the computer 510. A hard drive (magnetic disk or solid state), CD-ROM, and RAM are some examples of articles including a non-transitory computer-readable medium. For example, various computer programs 525 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    defining input for a purchase transaction that is to be subsequently completed on a Self-Service Terminal (SST) by a mobile device app that executes on a mobile device of a customer, wherein the mobile device is operated by a customer associated with the purchase transaction;
    initiating a transaction by transmitting, via a first wireless communication device of the mobile device, data defining the purchase transaction to pre-stage the purchase transaction on the server for download by the SST upon authentication of an account holder of an account, wherein the customer is the account holder of the account;
    establishing a communication link with the SST by connecting, wirelessly via a second wireless communication device to the mobile device;
    authenticating the customer by receiving, via the second wireless communication device of the mobile device, biometric data provided by a biometric reading device of the SST to authenticate the customer as the account holder who is operating the mobile device for the purchase transaction at the SST;
    matching, on the mobile device by the mobile device app, the received biometric data with stored biometric data of the account holder by:
    retrieving the stored biometric data stored on the mobile device; and
    comparing the received biometric data and the retrieved stored biometric data to identify a match and determining a confidence level thereof, wherein the stored biometric data stored on the mobile device is stored securely by the mobile device app and is not accessible and never shared by the mobile device app;
    finalizing the purchase transaction upon matching the received biometric data and the stored biometric data of the account holder on the mobile device, wherein finalizing further includes transmitting an authentication message via the second wireless communication device to the SST, wherein the transmitted authentication message includes an account identifier for the account, a security code or security certificate, and a transaction identifier for the purchase transaction, wherein transmitting the authentication message further causes the SST to receive, the data defining the purchase transaction from the server and causes the SST to process the data defining the purchase transaction on behalf of the customer on the SST, wherein the SST is an automated teller machine; and
    flushing a secure memory of the biometric data on the SST upon completion of authentication ensuring the biometric data of the customer is not stored or compromised on the SST.

2. The method of claim 1, wherein transmitting the authentication message to the SST includes transmitting the confidence level.

3. The method of claim 1, wherein the security code or security certificate includes security data certifying validity of the authentication message.

4. The method of claim 1, wherein the security data is encryption of at least a portion of the authentication message according to an encryption key stored on the mobile device.

5. The method of claim 1, wherein:
the first wireless communication device is one of a mobile wireless radio data communication device and a Wi-Fi data communication device of the mobile device; and
the second wireless communication device is one of the Wi-Fi data communication device, a BLUETOOTH® communication device, and a Near Field Communication (NFC) device of the mobile device.

* * * * *